United States Patent [19]
Morasse

[11] Patent Number: 5,916,067
[45] Date of Patent: Jun. 29, 1999

[54] SYSTEM FOR CONVERTING A BICYCLE INTO A BICYCLE EXERCISER

[76] Inventor: Lionel Morasse, 106, rue André, St-Raymond, Qc, Canada, G0A 4G0

[21] Appl. No.: 08/759,259

[22] Filed: Dec. 2, 1996

[51] Int. Cl.[6] .................................................. A63B 69/16
[52] U.S. Cl. .............................................................. 482/61
[58] Field of Search .............................. 482/61, 110, 57, 482/114; 434/61; 211/1, 17, 22; D21/194

[56] References Cited

U.S. PATENT DOCUMENTS

| | | | |
|---|---|---|---|
| 591,969 | 10/1897 | Hiekisch . | |
| 2,972,478 | 2/1961 | Raines | 272/73 |
| 3,526,042 | 9/1970 | Nelson | 35/11 |
| 3,572,758 | 3/1971 | Lee | 482/61 |
| 3,735,981 | 5/1973 | Mallin | 272/73 |
| 3,871,648 | 3/1975 | Maurer, III | 272/73 |
| 4,021,034 | 5/1977 | Olesen | 272/73 |
| 4,415,152 | 11/1983 | Smith | 482/61 |
| 4,580,983 | 4/1986 | Cassini et al. | 434/61 |
| 4,593,898 | 6/1986 | McLerran et al. | 482/61 |
| 4,648,597 | 3/1987 | Adler | 272/73 |
| 4,674,742 | 6/1987 | Baatz | 272/73 |
| 5,042,795 | 8/1991 | Bursik | 482/61 |
| 5,145,478 | 9/1992 | Minoura | 482/61 |
| 5,152,729 | 10/1992 | Phillips | 482/61 |
| 5,397,285 | 3/1995 | Haan et al. | 482/61 |
| 5,433,681 | 7/1995 | Minoura | 482/61 |

FOREIGN PATENT DOCUMENTS

| | | | |
|---|---|---|---|
| 1164021 | 3/1984 | Canada | 273/84 |
| 2657624 | 7/1991 | France | 482/61 |
| 0475207 | 11/1937 | United Kingdom | 482/61 |

*Primary Examiner*—Stephen R. Crow
*Attorney, Agent, or Firm*—François Martineau

[57] ABSTRACT

A system for converting a bicycle into a bicycle exerciser comprises a bicycle exerciser support having a base stably resting on the ground, the base having a pair of divergent integrally attached side legs. A pair of upwardly projecting support arms are integrally attached to the base side legs, and merge at their upper ends into a female coupling member. A complementary male coupling member is attached by means of a bracket to the seat tube of a conventional bicycle, under the seat thereof. Thus, the bicycle can be installed on the support by simply vertically resting the male coupling member onto the female load-bearing coupling member, for idling the rear tire which then becomes spaced over ground. A drag device comprising a dragging endless belt engages the rear tire, for selectively dragging the tire and offering resistance to the now stationary bicycle driver when pedalling. Lateral stabilizers are also provided on the support for attachment to the bicycle frame away from the seat, to reduce tilting and rocking of the bicycle during use.

19 Claims, 7 Drawing Sheets

SYSTEM FOR CONVERTING A BICYCLE INTO A BICYCLE EXERCISER

BACKGROUND OF THE INVENTION

1. Field of the Invention

This invention relates to a system for converting a bicycle into a bicycle exerciser.

This invention relates in particular to such a system to be used with a simple rotating drag device tensed against the rear tire to be forcibly driven by the rear tire of a bicycle, to provide drag thereon, with the rear tire being idled by being spacedly supported over ground.

2. Description of the Related Art

U.S. Pat. No. 5,152,729 dated Oct. 6, 1962 as invented by Phillips, describes in Columns 1–4 of the patent a plethora of patents disclosing supports and means for the rear tire of a bicycle to rest upon and in frictional engagement with a roller attached to the frame. These supports are attachable generally to the hub and hold the bicycle upright by means of upright arms perpendicular to the testing base. This means that if a bicycle accidentally tilts for any reason, it may become unstable and this loss of equilibrium may cause the bicycle to fall from the supports. Such is the case for instance with U.S. Pat. No. 5,397,285 dated Mar. 14, 1995 as invented by Haan et al, U.S. Pat. No. 5,145,478 dated Sep. 8, 1992 as invented by Minoura, U.S. Pat. No. 4,648,597 dated Mar. 10, 1987 as invented by Adler, U.S. Pat. No. 3,735,981 dated May 29, 1973 as invented by Mallin, U.S. Pat. No. 591,969 dated Oct. 19, 1897 as invented by Hiekisch, Canadian patent 1,164,021 dated Mar. 20, 1984 as invented by Pro. U.S. Pat. No. 2,972,478 dated Feb. 21, 1961 as invented by Raines, teaches another support which "includes a pair of vertically upwardly extending uptights, or frame sections that are substantially parallel with each other but in the embodiment. . . , shown" in FIG. 3, "are inclined slightly inwardly toward each other to receive the tear wheel therebetween.", as stated in Column 2, line of the Patent. U.S. Pat. No. 4,021,034 dated May 3, 1997 as invented by Olesen teaches Y-legs which may have strut legs, if the weight of a person causes flexibility of upright leg members of a frame, as stated in column 4, line 13 of the Patent. U.S. Pat. No. 4,674,742 dated Jun. 23, 1987 as invented by Baatz describes side members that "extend generally in parallel fashion", and "have their upper ends interconnected by a crossmember", though FIG. 2 of the Patent illustrates inclined upper portion of the side members, after having been fixed to the hub of a rear wheel of a bicycle. Another frame is disclosed in U.S. Pat. No. 4,580,983 dateds Apr. 8, 1986 as invented by Cassini et al.

U.S. Pat. No. 4,415,152 dated Nov. 15, 1983 as invented by Smith and U.S. Pat. No. 3,526,042 dated Sep. 1, 1970 as invented by Nelson describe frictional engagement of a rear wheel of a bicycle with rollers that are driving an endless belt for driving the front wheel of the bicycle. U.S. Pat. No. 3,871,648 date Mar. 18, 1975 as invented by Maurer, U.S. Pat. No. 4,593,898 dated Jun. 10, 1986 as invented by McLerran et al, and U.S. Pat. No. 5,433,681 dated Jul. 18, 1995 as invented by Minoura describe still other frictional engagements of a rear wheel.

SUMMARY OF THE INVENTION

The aim of this invention is to have a bicycle exerciser support which offers the least chance to tilt and thereby increases stability of the bicycle, and prevents accidental tilting of the bicycle which would then he prone to falling off the support.

The aim of this invention is also a) obtain with a minimum of structure a system to quickly convert a bicycle into a bicycle exerciser and vice versa.

Another object of this invention is to have a rotating drag device tensed against the rear tire which yields a smooth and pleasant rotation of the rear wheel, while dissipating the rotational tire energy by partially braking the rear tire, thus providing a drag thereon.

The present invention more particularly relates to a system for converting a bicycle into a bicycle exerciser, said bicycle having a seat tube, a seat post, chain stays, a rear tire, said rear tire defining a top, said system comprising: a bicycle exerciser support having a base, said base having longitudinal sides and arms upwardly extending from said longitudinal sides of said base, so as to converge and to merge into a two-part coupling device having a first and a second part, said arms holding said coupling device first part, said arms defining a lower portion, adjacent to said base, an intermediate portion above said lower portion, and an upper portion, and the second part of said coupling device having means for fastening to the seat tube of a bicycle adjacent to the seat post of the bicycle, as to jack the rear tire of the bicycle and enable idling of the rear tire, said arms of said bicycle exerciser support enabling a stable equilibrium increase of the bicycle, and preventing falling thereof; wherein in said two-part coupling device, said second part has a laterally elongated V-shaped male coupling member supported on the bicycle seat tube by means of a bracket, and said first part of said coupling device has a laterally elongated V-shaped female load-bearing member attached at the upper end of said arms which is complementary to said male coupling member.

The present invention also relates to a bicycle exerciser support for supporting a conventional bicycle so that it may be used as a stationary bicycle exerciser, the bicycle of the type defining a bicycle frame, a front wheel, a rear wheel supported by the bicycle frame and driven into rotation by pedals connected to the rear wheel by a chain, and a seat supported by said frame, said bicycle support comprising:

a rigid base;

a pair of rigid support arms having upper and lower ends, said arms being attached to said base at their lower ends and upwardly-projecting therefrom;

a coupling device having a first load-bearing coupling member and a second coupling member complementary to said first coupling member, with said arms upwardly converging and being linked at their upper ends to said first coupling member, and with said second coupling member being adapted to be attached to the bicycle frame near the seat;

wherein the bicycle rear wheel can be idled by lifting the rear wheel spacedly over ground and vertically releasably resting said second coupling member onto said first load-bearing coupling member so that the rear wheel be positioned between said support arms, pedalling thus effectively allowing rotation of the rear wheel while the bicycle will remain stationary; and wherein a stable releasable support of the bicycle is obtained by the coupling device which allows the bicycle frame to be supported near the seat.

The present invention also relates to a method for converting a bicycle exerciser support and a conventional bicycle into a bicycle exerciser, the bicycle of the type defining a bicycle frame, a front wheel, a rear wheel supported by the bicycle frame and driven into rotation by pedals connected to the rear wheel by a chain, and a seat supported by said frame, and the bicycle exerciser support of the type defining a front and a rear end and comprising a base, a pair of spaced support arms having lower ends attached to the base and upper ends, clips installed on the support arms, a first load-bearing coupling member attached at the upper ends of the arms, a second coupling member attached to the bicycle frame near the seat by means of a bracket and a drag device attached to at least one of the arms and movable between an operative and a non-operative position, said method comprising the steps of:

a) inserting the bicycle rearwardly between the support arms;

b) lifting the bicycle rear wheel to vertically rest the second coupling member onto the first coupling member, whereby the rear wheel will become spaced over ground and idled;

c) moving said drag device into its operative position, whereby it will engage the bicycle rear wheel;

d) releasably attaching the clips onto the bicycle frame at a location spaced from the seat, whereby lateral stability of the bicycle is enhanced.

BRIEF DESCRIPTION OF THE DRAWINGS

In the drawings which illustrate some of the preferred ways of carrying out the invention.

DETAILED DESCRIPTION OF THE PREFERRED EMBODIMENTS

Figure 1:
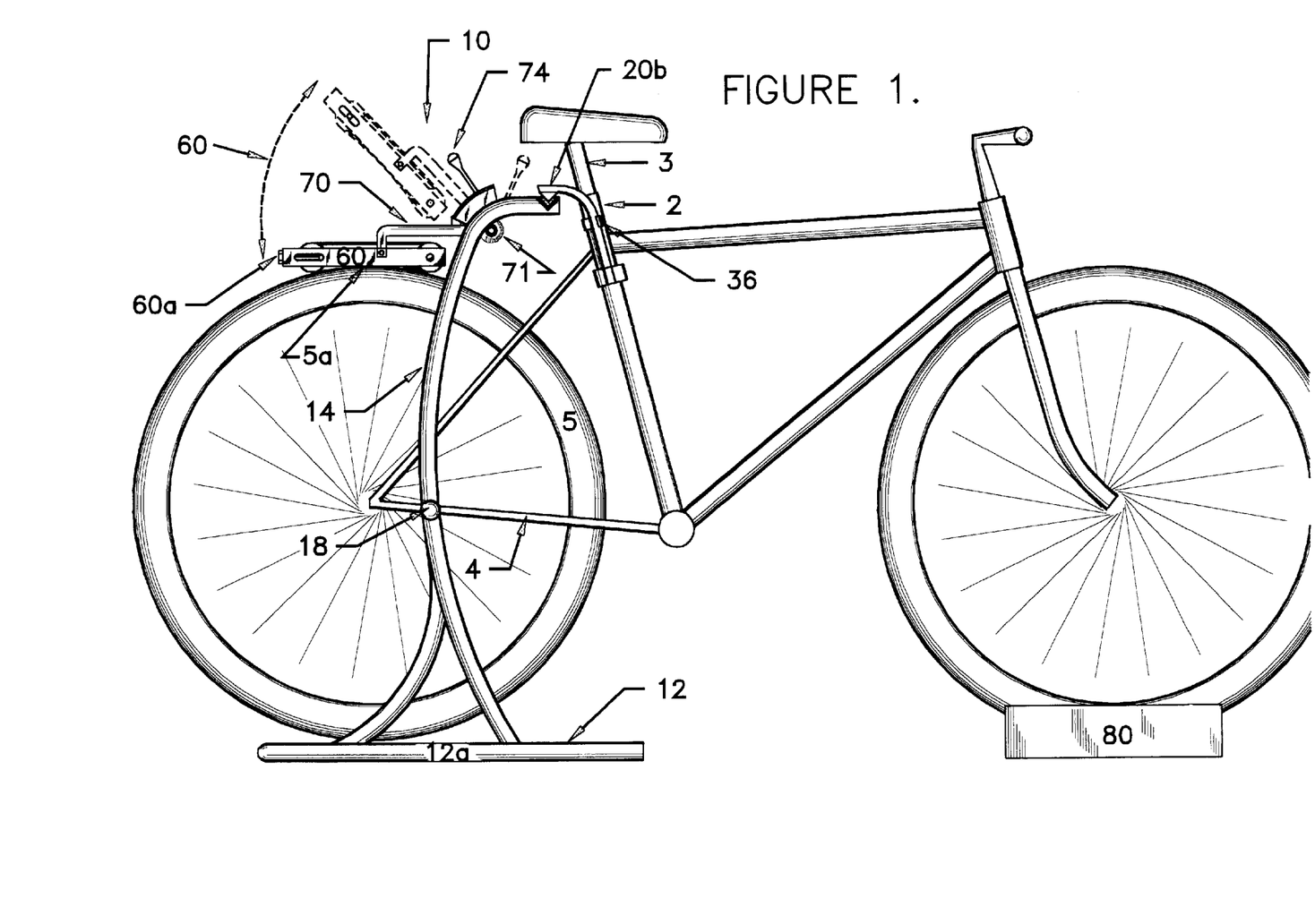
FIG. 1 is a side view of a bicycle with a system for converting a bicycle into a bicycle exerciser.
Figure 2:
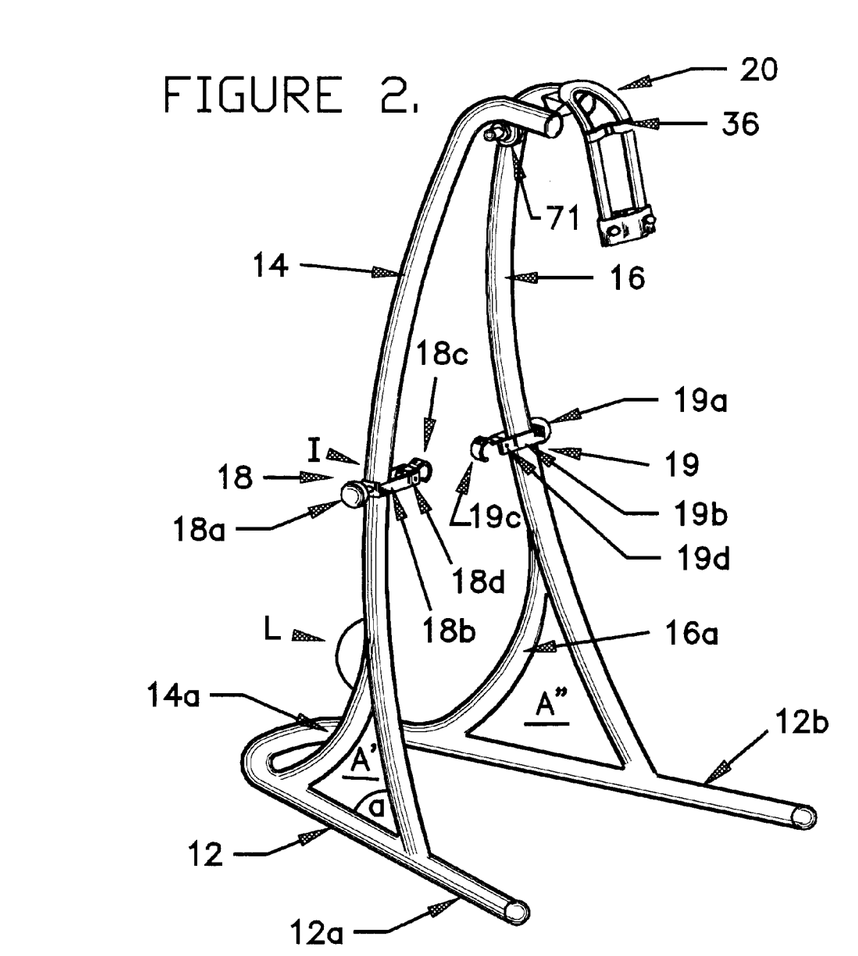
FIG. 2 is a perspective view of the bicycle exerciser support.

In FIGS. 1 and 2, a system 10 is shown for converting a conventional bicycle 1 into a bicycle exerciser.

The bicycle 1 has a seat tube 2, a seat post 3, chain stays 4, and a rear tire 5 defining a top edge portion 5a.

Figures 3, 4, 4A:
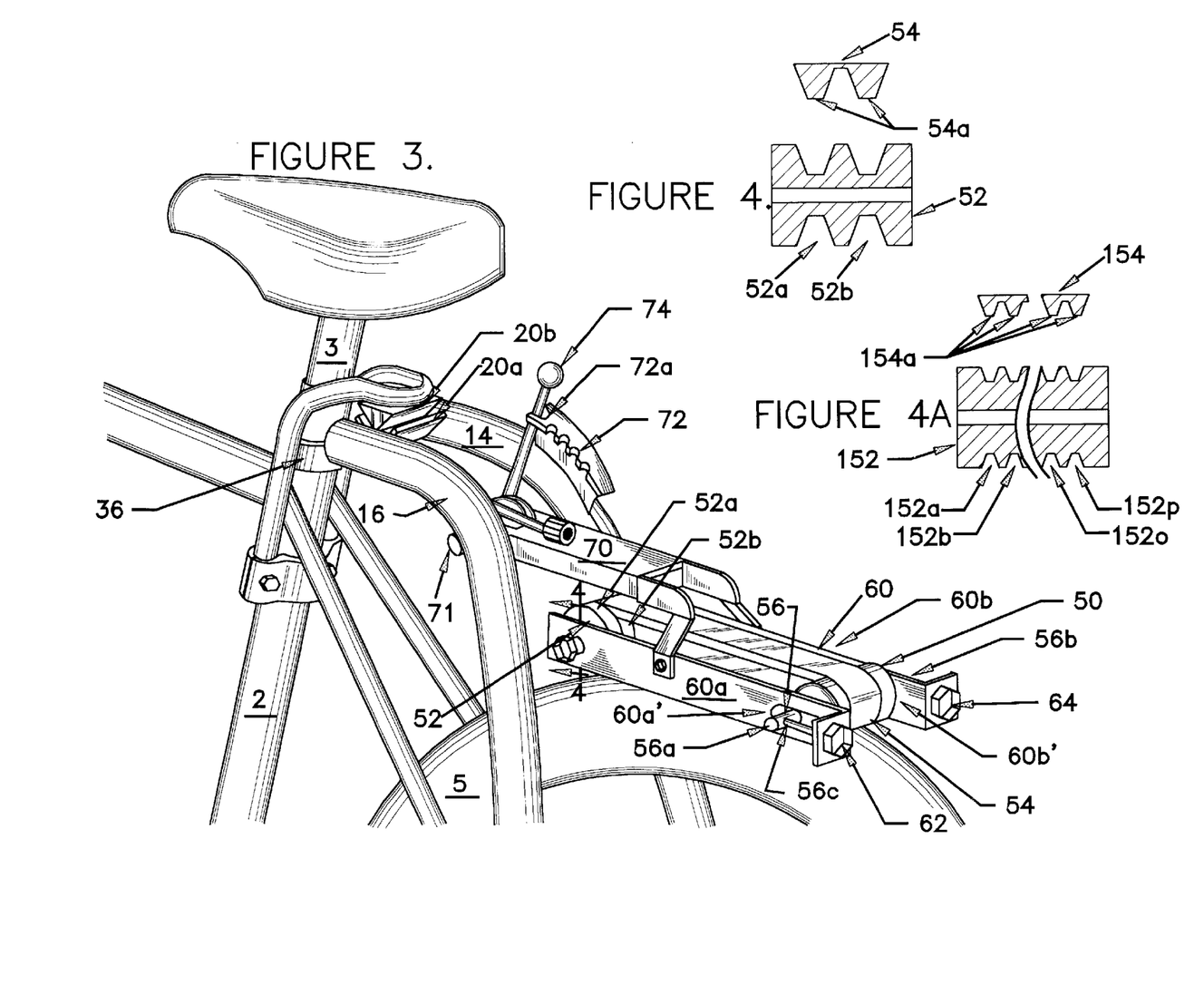
FIG. 3 is an enlarged top, rear perspective view of the bicycle with the upper part of the system for converting a bicycle into a bicycle exerciser.
FIG. 4 is an enlarged cross-sectional view taken along line 4—4 of FIG. 3, but with the belt in the upper part being spaced from the pulley wheel, and the belt in the lower part being removed, for clarity of the drawing.
FIG. 4a is similar to FIG. 4, but with the endless belt having a plurality of ridges and the pulleys having a plurality of corresponding grooves.

The system 10 comprises a bicycle exerciser support having a U-shaped base 12, the base having spaced-apart and divergent longitudinal side legs 12a, 12b; and arms 14, 16 upwardly extending from the longitudinal sides of the base, so as to converge and to merge into a two-part coupling device 20 defining a first and a second part 20a and 20b (FIG. 3). Arms 14, 16 define a lower portion L, adjacent to the base, and an intermediate portion 1 above the lower portion.

The coupling device second part 20b has bracket means for fastening it to the seat tube 2 of bicycle 1 adjacent to the seat post 3, so as to jack the rear tire 5 of the bicycle 1 and enable idling of the rear tire 5.

The arms of the bicycle exerciser support increase the stability of the bicycle, and prevent accidental tilting and falling thereof. Enhanced stability is obtained, because the combined weights of the bicycle and of the person sitting on the bicycle seat arc supported via the seat tube by this bicycle exerciser support, and more particularly by the downwardly divergent arms of the exerciser support which are anchored at their lower extremities to the stable, U-shaped exerciser base 12 which comprises a pair of divergent elongated side legs 12a, 12b which are adapted to flatly engage the ground. Although the base 12 is shown to be a U-shaped tubular frame, it is understood that other stable configurations of the base are envisioned.

Each of the arms 14, 16 upwardly extending from the longitudinal sides of the base 12 is arcuated, and is provided at its lower portion 1, with an auxiliary arcuated reinforcing member 14a, 16a, such that each arm 14, 16 upwardly extends at an acute angle "a" (FIG. 3) relative to the corresponding side leg 12a, 12b to which it is attached. Each of the auxiliary arcuated reinforcing members 14a, 16a links arms 14, 16 to its corresponding base side leg 12a, 12b in an inclined fashion so as to define a triangular substantially planar frame structure, referenced as A' and A" in FIG. 2, with structures A', A" being inclined toward each other at their apex.

In a preferred embodiment as shown in FIG. 2, the intermediate portion 1 of each arm 14, 16 is provided with a retaining clip 18 and 19, for releasably holding a corresponding one of the chain stays 4 of the bicycle. Each of these clips 18, 19 has an inwardly projecting U-shaped bracket 18b, 19b for laterally straddling arms 14, 16 and an outward threaded opening on its web for receiving a manually operable screw or bolt 18a, 19a which can releasably fasten bracket 18b, 19b to the corresponding arm 14, 16. A hook-like finger 18c, 19c is pivotally mounted via a pivot 18d, 19d onto the inward extremity of bracket 18b, 19b. The hook 18c, 19c has a U-shaped downwardly oriented opening for receiving the chain stays 4 of the bicycle, by yieldingly resiliently snapping thereon and pivoting towards its corresponding arms 14, 16 to laterally stabilize bicycle 1 while it is held over ground.

As shown in FIG. 3, in a preferred embodiment, in the two-part coupling device 20, the second part 20b of the coupling device has a laterally-extending, cross-sectionally triangular and downwardly oriented male member or hook shaped to engage the first part 20a of the coupling device, which defines a complementary laterally-extending V-shaped load-bearing female member, This complementary male-female engagement allows the combined loads of the bicycle and its rider to be supported by the female load-bearing member 20a, which is located near the center of gravity of the combined loads of the bicycle and the rider, with the V-shape of the female member 20a urging the complementary triangular male member 20b into a stable engagement therewith. The complementary laterally-elongated V-shapes of the male and female coupling members 20a, 20b of the coupling device effectively reduce rocking and tilting of the bicycle.

Figure 5:
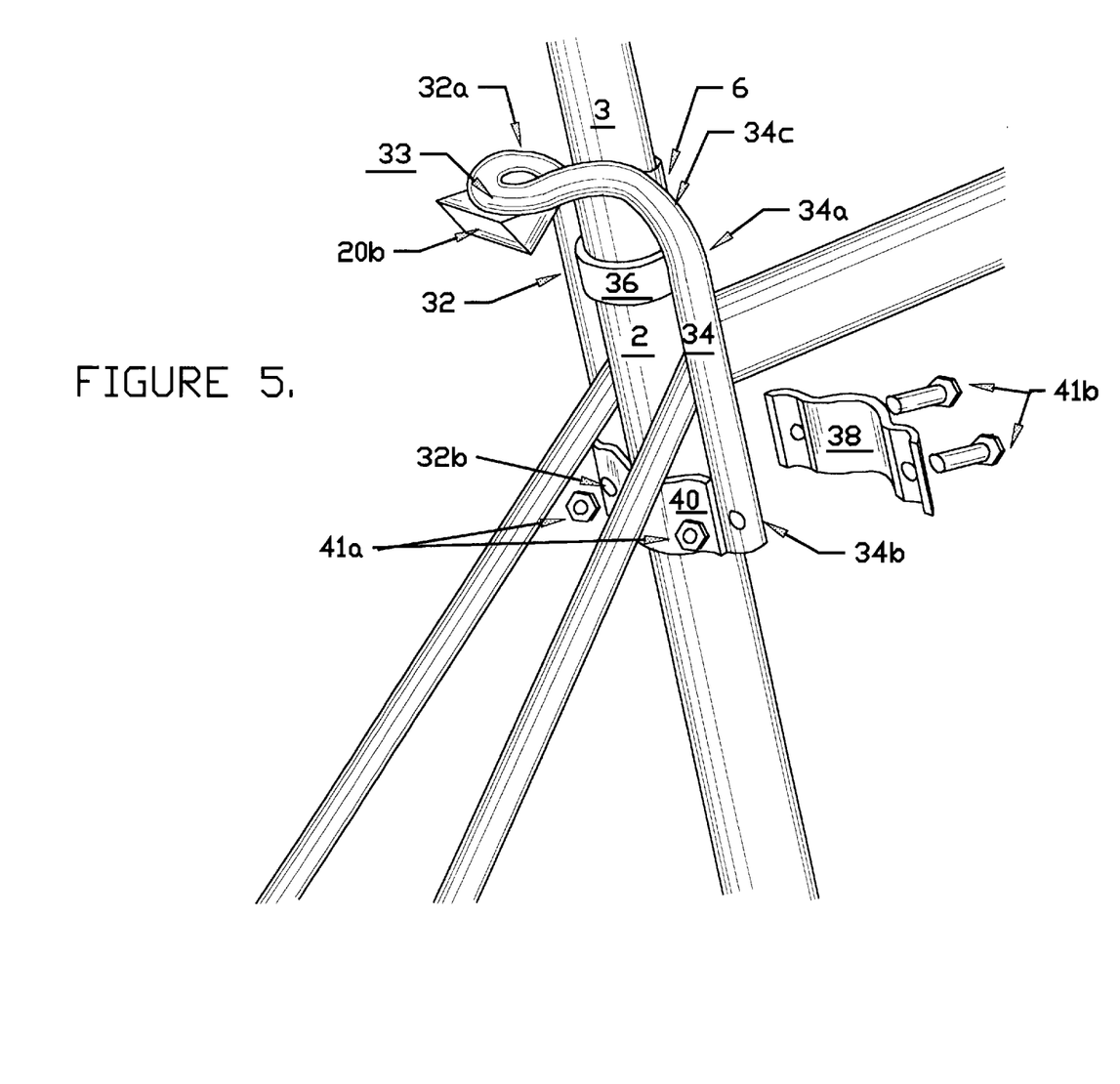
FIG. 5 is an enlarged perspective and partly exploded view of the bracket portion of the system for converting a bicycle into a bicycle exerciser, which is to be mounted onto the bicycle.

As shown in FIG. 5, the second part of the coupling device 20b has bracket means for fastening it to the seat lube 2 of bicycle 1 adjacent to the seat post 3 of the bicycle, which consists in two tubular arm members 32, 34 for running parallel to the seat tube 3 of bicycle 1 so as to sandwich the seat tube, the tubular members having lower ends 32a, 34a and being elbowed at 32c, 34c to merge into a rearwardly-projecting web 33 which supports male coupling member 20b. Arms 32, 34 are provided with an open U-shaped abutment member is 36 at 32a, 34a adjacent the arms elbowed portions 32c, 34c and bridging the two tubular arm members 32, 34 so as to partly surround and abut against the rear surface of the seat tube 2. A locking seat collar 6 of bicycle 1 over scat tube 2 for locking seat post 3, may be sandwiched between the open U-shaped member 36 and the U-shaped bracket web 33.

The arms lower ends 32b, 34b of the tubular members are provided with a hole, and retaining plates 38, 40 are bolted with bolts and nuts 41a, 41b on opposite sides of arms 32, 34 to fasten same to scat tube 2 In FIG. 5, the retaining plate 40 which is similar to the retaining plate 38, is cut out in the vicinity of the lower end 34b, in order to show the hole in the tubular member 34. Alternate suitable fastening means may also be used if desired.

A drag device is installed on the upper portion of arms 14, 15, to releasably engage the upper edge portion 5a of tire 5 and thus selectively provide drag thereon to exercise the rider of the bicycle.

Preferably and as shown in FIG. 3, the drag device tensed against the rear tire comprises two rotatably mounted, spaced, parallel pulleys 50, 52 with an elastic or resilient endless belt 54 being tensed therebetween, whereby the belt can be forcibly driven by the rear tire brought into idle rotation by the rider, with pulleys 50, 52 and belt 54 providing rotational frictional resistance to confer drag so that the rider will effectively spend mote energy pedalling, thereby accomplishing an exercise.

Preferably, the endless belt has at least one or several truncated V-shaped projections or ridges or crests such as the two ridges 54a (FIG. 4), and the pulleys 50, 52 have complementary registering truncated V-shaped depressions, flutes or grooves 52a and 52b. It has been found that as the number of grooves increases, the rotational smoothness of the endless belt, and therefore of the pedaling operation, is increased, and furthermore that the depth of the truncated V-shaped crests may advantageously be decreased by increasing the number of crests.

In a preferred embodiment shown in FIG. 4a, the endless belt has from 4 to 16 truncated V-shaped ridges 154a, and correspondingly the pulleys have 4 to 16 truncated V-shaped grooves 152a, 152b, . . . , 152o, 152p, for receiving therein the ridges of the endless belt; extending from a few larger to smaller V-shaped ridges and grooves as the number increases. For example of width and depth, smaller ridges can have 1/16 inch dimensions, and larger ridges can have 5/32 inch dimensions.

Preferably, the rotating device tensed against the rear tire includes a means for adjusting the tension between the belt and the pulleys. In a particular embodiment this consists in providing a means to displace one of the pulleys toward the other pulley in order to tighten the belt, and from the other pulley in order to loosen the belt. This is allowed by the fact that the belt has an intrinsic elasticity, as known in the art.

As shown in FIG. 3, one of the ways to obtain this result is to have one of the pulleys 50 rotatably mounted about a shaft 56 having opposite ends 56a, 56b, with a bearing between the shaft and the pulley as is well known, the shaft having at both ends a threaded hole such as 56c. A frame 60 having opposite elongated apertures 60a', 60b' holds the opposite extremities of shaft 56 therein so that it may be selectively slided between a first and a second limit positions that allow tightening and loosening of the belt to quantitatively adjust the drag of the drag device on tire 5. Bolts 62, 64 rotatably mounted onto the frame 60 engage each of the protruding ends of shaft 56, at complementary thread holes 56c, to allow selective displacement of shaft 56 along apertures 60a', 60b' and relative to pulley 52.

Figure 9:
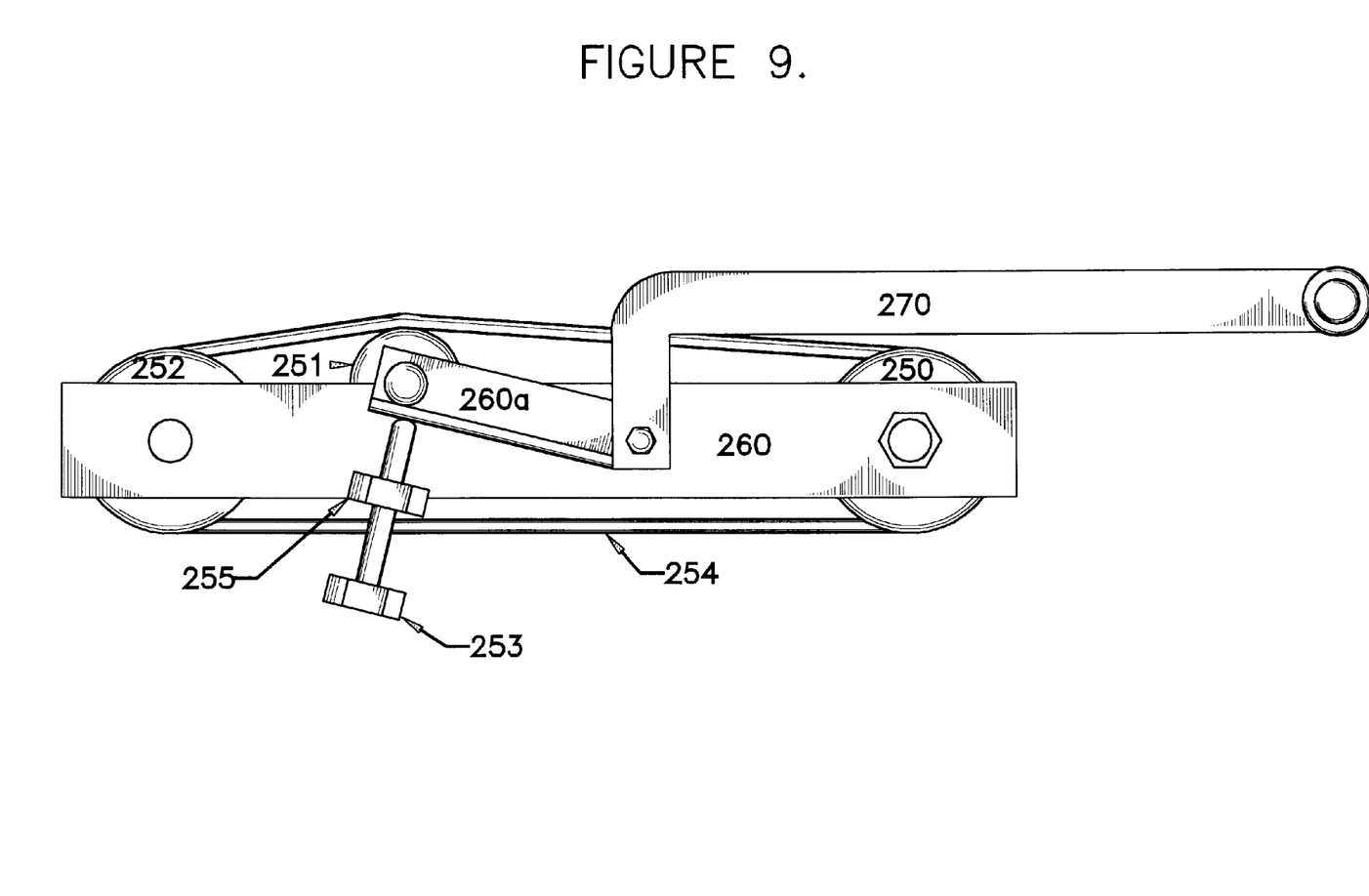
FIG. 9 is a side view of another rotating device to be tensed against the rear tire of a bicycle.

Though less preferred, as shown in FIG. 9, another means for adjusting the tension of the belt on the pulleys consists in providing an auxiliary pulley 251 mounted on frame 260, which can be selectively pivoted by means of an auxiliary arm 260a away or towards frame 260 to correspondingly engage or disengage belt 254 so as to consequently tighten or loosen it. This is accomplished with a bolt and nut assembly 253, 255, with nut 255 being fixed to frame 260.

Figures 7, 7A:
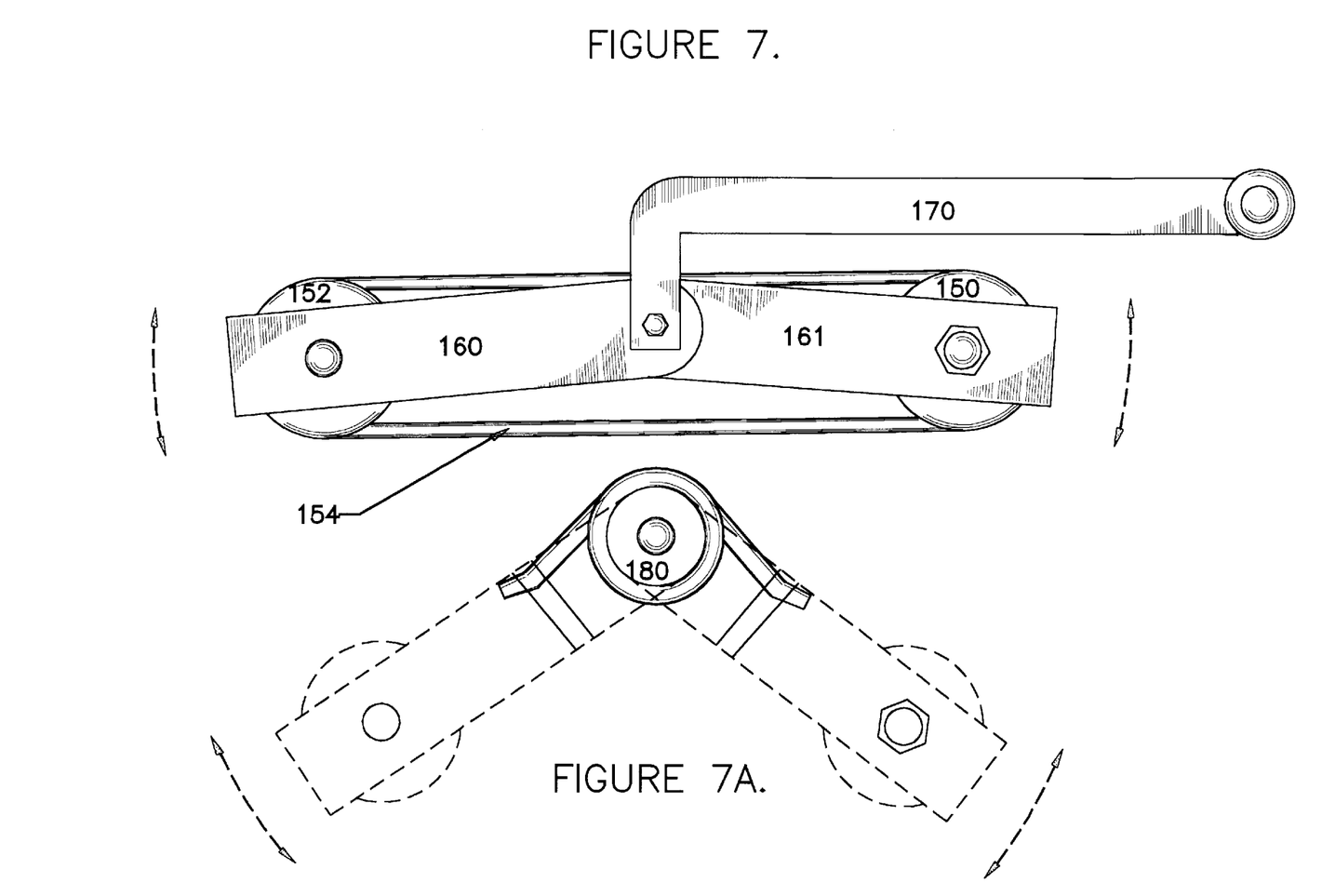
FIG. 7 is a side view of another rotating device to be tensed against the rear tire of a bicycle.
FIG. 7a is a view similar to FIG. 7, but showing the rotating device of FIG. 7 in dotted lines except for the internal pivot and spring portion thereof which are shown in full lines.

FIGS. 7 and 7a show another means for adjusting the tension of the belt on the pulleys, which consists in providing a frame having two parts 160, 161 being pivotally attached to each other to allow selective displacement toward each other, and away from each other, as shown by the arrows. Pulleys 150, 152 are rotatably mounted at the opposite ends of frame parts 160, 161, with an endless belt 154 being tensed on the pulleys, and urging the pulleys to be displaced toward each other, as suggested in dotted lines in FIG. 7a. A spring 180 urges the two frame parts 160, 161 away from each other, and thereby allows selective adjustment of the tension of belt 154. The two frame parts 160, 161 are pivotally mounted to a tension arm 170 attached at the upper end of arms 14, 16 (FIG. 1).

As shown in FIG. 3, a shaft 71 mounted onto the upper portion of arms 14, 16 pivotally holds a tension arm 70 which can be pivoted by means of an integral lever 74 operatively engaging a selected slot on a slotted board 72, each slot of the slotted board 72 defining a degree of tension of the belt against the rear tire, and allowing adjustment for tires of various sizes, A spring (not shown) can be included on shaft 71 to act as a shock absorber in cases where a tire such as 5 is uneven, the spring thereby allowing a smoother rotation of belt 54.

It should be noted that this tension arm arrangement allows not only selective adjustment of the pressure applied by belt 54 on tire 5, but also allows selective adjustment of the belt 54 to rear tires of different sizes by simply lowering or raising the selector lever 74 for smaller or larger tires respectively. The slotted board 72 is preferably provided with finger grips 72a for locking therein the selector lever 74 so as to allow the rear wheel of bicycles to be inserted into the bicycle exercise support, without any interference.

The means to selectively adjust the level of engagement, and consequently the tension, of the belt on the rear tire may differ from that described hereinabove, for example by providing a manually operable screw that would selectively raise or lower the frame portion 60 holding the belt. However, the pivotal adjustment of frame 60 is the preferred way to carry out this invention.

Figure 6:
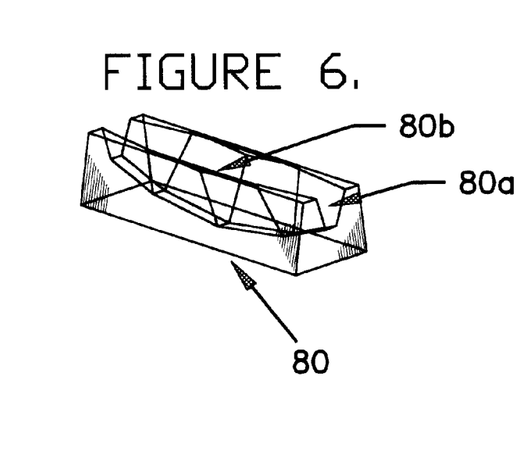
FIG. 6, on the second sheet of drawings, is an enlarged perspective transparent view of a block for resting the front tire of a bicycle thereon.

As shown in FIG. 6, next to FIG. 2, the front tire of the bicycle may simply be held into a simple wood block or block of other suitable rigid material 80, defining a truncated V-shaped curve groove 80a fitting the front tire, or other means holding the front tire or the front wheel. This groove has preferably inner walls having sharp edges 80b for allowing enhanced adherence of the front tire thereon.

As can be understood from the drawings and the hereinabove description of the invention, it can be seen that once the bracket 32, 33, 34 holding the second male coupling member is installed on the bicycle seat tube 2, the bicycle needs only to be raised over ground so as to vertically engage or rest onto the male coupling member 20b into the female coupling member 20a for the rear tire 5 to be supported spacedly over ground and therefore be idled. The front tire is then positioned inside block 80, and the chain stays are fixed with brackets 18, 19 to help prevent lateral tilting and rocking of the bicycle. The drag device can then be lowered into contact with the rear tire for greater rotational resistance of the rear tire, to obtain an operative bicycle exerciser. The system 10 according to the invention is thus simple and quick in its installation.

Figure 8:
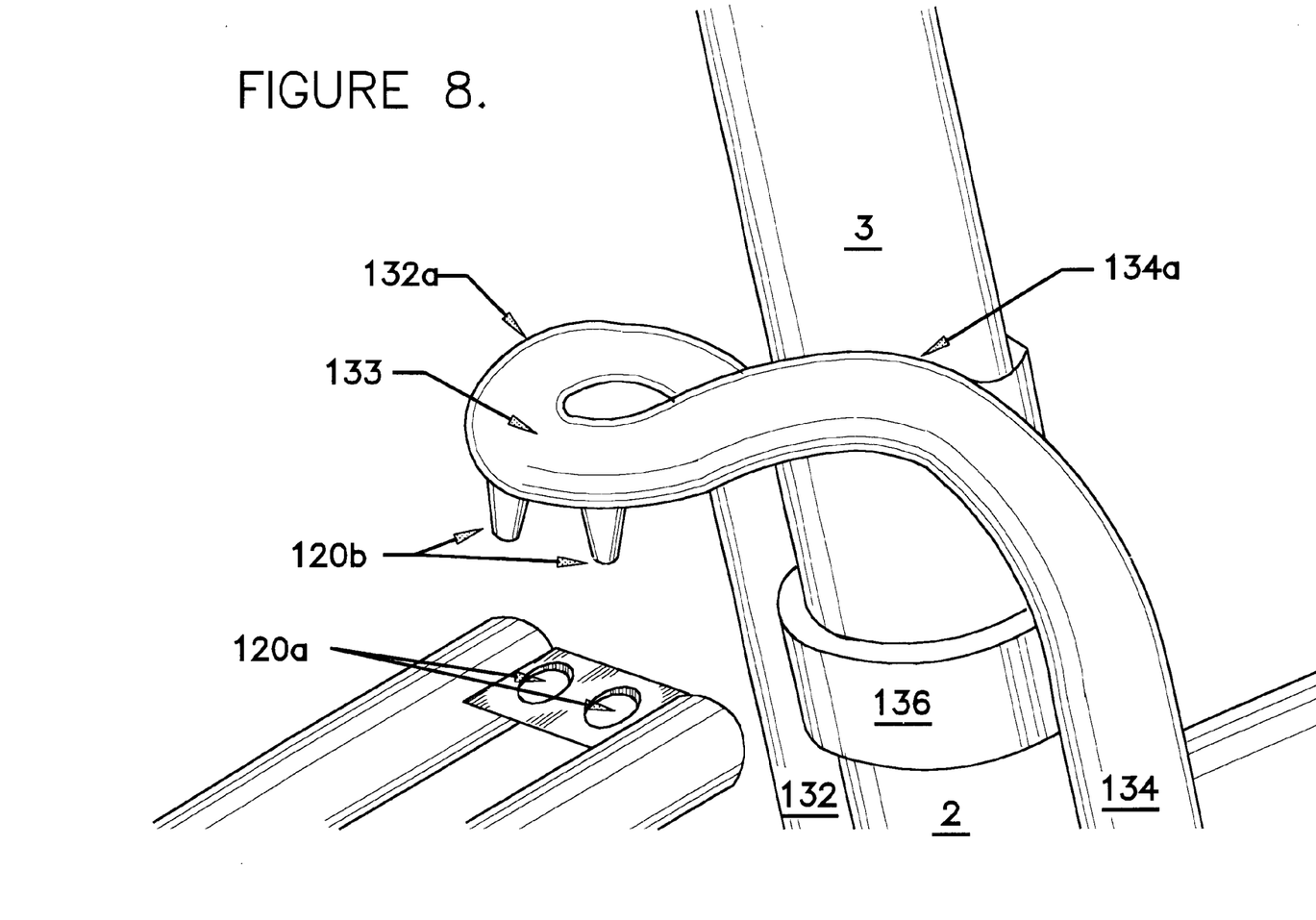
FIG. 8 is an enlarged perspective and partly exploded view of an alternate two-part coupling device.

As shown in FIG. 8, another embodiment, the two-part coupling device consists in the tubular web 133 being provided with a second male coupling part 120b having two studs downwardly projecting therefrom, and the first female coupling part 120a being a plate defining corresponding female bores for snugly fitting the studs therein. Preferably, the male and female members taper at their tip end.

While some of the preferred embodiments have been described hereinabove, it is to be understood that the invention is not to be construed as limited to these preferred embodiments, as many modifications and variations are possible within the spirit and scope of the appended claims.

I claim:

1. A system for converting a bicycle into a bicycle exerciser, said bicycle having a seat tube, a seat post, chain stays, a rear tire, said rear tire defining a top, said system comprising: a bicycle exerciser support having a base, said base having longitudinal sides and arms upwardly extending from said longitudinal sides of said base, so as to converge and to merge into a two-part coupling device having a first and a second part, said arms holding said coupling device first part, said arms defining a lower portion, adjacent to said base, an intermediate portion above said lower portion, and an upper portion, and the second part of said coupling device having means for fastening to the seat tube of a bicycle adjacent to the seat post of the bicycle, as to jack the rear tire of the bicycle and enable idling of the rear tire, said arms of said bicycle exerciser support enabling a stable equilibrium increase of the bicycle, and preventing falling thereof; wherein in said two-part coupling device, said second part has a laterally elongated V-shaped male coupling member supported on the bicycle seat tube by means of a bracket, and said first part of said coupling device has a laterally elongated V-shaped female load-bearing member attached at the upper end of said arms which is complementary to said male coupling member.

2. The system for converting a bicycle into a bicycle exerciser as defined in claim 1, wherein said base consists in a U-shaped tubular frame, each of said arms upwardly extending from said longitudinal sides of said base, are arcuated, and are each provided at their lower portion, with an auxiliary arcuated reinforcing member, such that for each arm, the arm is upwardly extending at an acute angle from said tubular frame defining said longitudinal sides of said base, and each of said auxiliary arcuated reinforcing members define an acute angle with the tubular frame and with one of said arms upwardly extending, so as to define a triangular plane, each of said triangular planes having an apex, and the triangular planes are inclined toward each other, at their apex.

3. The system for converting a bicycle into a bicycle exerciser as defined in claim 1, wherein said intermediate portion of said arms upwardly extending from said longitudinal sides of said base, is provided with a retaining clip for releasably holding the chain stays of the bicycle.

4. The system for converting a bicycle into a bicycle exerciser as defined in claim 1, which includes a rotating device tensed against the rear tire to be driven by the rear tire to provide a drag, said rotating device being rotatably mounted onto said arms upwardly extending from said longitudinal sides of said base, adjacent to said one part of said coupling device, for:

moving toward said top of said rear tire and be releasably held, and for moving away from said top of said rear tire, and thereby adjusting the devices tensed against the rear tire to the height of the rear tire of the bicycle and adjusting the tension over the tire, of the devices tensed against the rear tire.

5. The system for converting a bicycle into a bicycle exerciser as defined in claim 4, wherein said rotating device tensed against the rear tire is two rotatably mounted pulleys, one of said pulleys being spaced from the other, and said pulleys having an endless belt mounted thereon, whereby said belt is driven by said rear tire, said belt rotating by said rear tire, causing drag.

6. The system for converting a bicycle into a bicycle exerciser as defined in claim 5, wherein said endless belt has a cross-section defining at least one truncated V-shaped ridge, and said pulleys have a corresponding cross-section defining at least one truncated V-shaped groove for receiving therein said at least one truncated V-ridge of said endless belt.

7. The system for converting a bicycle into a bicycle exerciser as defined in claim 5, wherein said endless belt has from 4 to 16 truncated V-shaped ridges, and correspondingly the pulleys have from 4 to 16 truncated V-shaped grooves for receiving therein the ridges of the endless belt.

8. The system for converting a bicycle into a bicycle exerciser as defined in claim 5, which includes a means for adjusting the tension between said belt and said pulleys.

9. The system for converting a bicycle into a bicycle exerciser as defined in claim 5, which includes a means for adjusting the tension between said belt and said pulleys, which means for adjusting the tension between said belt and said pulleys, consists in providing a means to displace one of said pulleys toward said other pulley in order to tighten said belt, and from said other pulley in order to loose said belt.

10. A bicycle exerciser support for supporting the rear wheel of a bicycle spacedly over ground so that a stationary bicycle exerciser be formed, the bicycle of the type defining a main rigid frame, front and rear wheels rotatably carried by the bicycle frame, a pedal and chain drive for the rear wheel, a handle over the front wheel and a seat supported by the bicycle frame over the rear wheel, said bicycle support comprising:

a rigid ground base;

a pair of rigid upright support arms having top and bottom ends, said support arms being attached to said base at their bottom ends and laterally spaced from one another, wherein a rear wheel engaging passage is formed therebetween;

a coupling device including a first load-bearing coupling member and a second coupling member complementary to said first coupling member, said first coupling member integrally carried by said support arms top ends and said second coupling member releasably attachable to the bicycle frame in closely spaced fashion relative to the seat;

wherein the bicycle rear wheel can be idled by lifting the rear wheel spacedly over ground and engaging the rear wheel through and beyond said passage and vertically releasably resting said second coupling member onto said first load-bearing coupling member, pedalling thus effectively allowing free rotation of the rear wheel while the bicycle will remain stationary;

and wherein a stable and safe releasable support of the bicycle is obtained by the coupling device which releasably interlocks said support to the bicycle frame at a location closely spaced to the seat.

11. A bicycle exerciser support as defined in claim 10, wherein said coupling device is a male female coupling device with either one of said first and second coupling members being a male coupling member, and the other one of said first and second coupling members being a female coupling member complementary to said male coupling member.

12. A bicycle exerciser support as defined in claim 11, wherein said first coupling member is an elongated V-shaped upwardly opened female groove fixedly attached at the upper end of said pair of support arms, and said second coupling member comprises an elongated cross-sectionally triangular downwardly oriented male hook for attachment to the bicycle frame spacedly proximate the seat by means of a bracket, whereby said elongated triangular male hook can engage said elongated V-shaped female groove for stable complementary abutment therein.

13. A bicycle exerciser support as defined in claim 4, wherein said first coupling member comprises a load-bearing plate having a pair of spaced-apart upwardly opened female openings, said plate being fixedly attached at the upper end of said pair of arms, and said second coupling member comprises a bracket for attachment to the bicycle frame near the seat and having a pair of downwardly oriented male studs sized and spaced so as to be engageable within said openings, whereby said bracket may abut stably upon said load-bearing plate for stable support of the bicycle on said bicycle support due to the engagement of said studs within said openings.

14. A bicycle exerciser support as defined in claim 10, defining a front end through which the bicycle is to be inserted and a rear end opposite mid front end, wherein each one of id pair of support arms is arcuate so as to be rearwardly convex.

15. A bicycle exerciser support as defined in claim 14, wherein said base comprises an integral U-shaped tubular bar having a web and a pair of diverging side legs, with each one of said pair of support arms being fixedly attached to a corresponding one of said side legs.

16. A bicycle exerciser support as defined in claim 10, wherein each one of said pair of support arms comprises a retaining clip attached thereto, for releasably laterally engaging a portion of the bicycle frame at a location intermediate said base and said seat, for improving lateral stability of the bicycle when it is supported by said bicycle support.

17. A bicycle exerciser support as defined in claim 10, further comprising a drag device installed on at least one of said pair of support arms, said drag device being destined to releasably frictionally engage the top run of the rear wheel of the bicycle for partially braking the wheel thereby requiring a greater pedalling force to drive the wheel into a rotative movement.

18. A bicycle exerciser support as defined in claim 17, wherein said drag device is pivotally carried by said pair of support arms and comprises a drag device frame supporting a pair of spaced-apart pulleys and a resilient endless belt tensed between said pulleys, with said endless belt being adapted to releasably engage the top run of the rear wheel of the bicycle for causing resistance to the rotational movement thereof while it is driven thereby.

19. A bicycle exerciser support as defined in claim 10, further comprising a ground support block having a groove for releasably receiving therein the bottom run of the front wheel of the bicycle, to bring the front and rear wheels in generally coplanar fashion to each other so as to help prevent accidental pivotal displacement thereof when the bicycle is supported by said bicycle exerciser support.

* * * * *